United States Patent
Clauer et al.

(10) Patent No.: US 7,321,105 B2
(45) Date of Patent: Jan. 22, 2008

(54) LASER PEENING OF DOVETAIL SLOTS BY FIBER OPTICAL AND ARTICULATE ARM BEAM DELIVERY

(75) Inventors: Allan H. Clauer, Worthington, OH (US); Jeff L. Dulaney, Delaware, OH (US); David F. Lahrmann, Powell, OH (US); David Sokol, Dublin, OH (US)

(73) Assignee: LSP Technologies, Inc., Dublin, OH (US)

(*) Notice: Subject to any disclaimer, the term of this patent is extended or adjusted under 35 U.S.C. 154(b) by 13 days.

(21) Appl. No.: 10/784,725

(22) Filed: Feb. 20, 2004

(65) Prior Publication Data

US 2004/0232125 A1    Nov. 25, 2004

Related U.S. Application Data

(60) Provisional application No. 60/449,565, filed on Feb. 21, 2003.

(51) Int. Cl.
*B23K 26/00* (2006.01)
(52) U.S. Cl. .................. 219/121.85; 219/121.78; 219/121.79
(58) Field of Classification Search .......... 219/121.85, 219/121.78, 121.79, 121.82, 121.6
See application file for complete search history.

(56) References Cited

U.S. PATENT DOCUMENTS

| | | | | |
|---|---|---|---|---|
| 4,937,421 A | * | 6/1990 | Ortiz, Jr. et al. | 219/121.68 |
| 5,911,890 A | * | 6/1999 | Dulaney et al. | 219/121.85 |
| 6,002,102 A | * | 12/1999 | Dulaney et al. | 219/121.85 |
| 6,288,358 B1 | * | 9/2001 | Dulaney et al. | 219/121.6 |
| 6,566,629 B1 | * | 5/2003 | Dulaney et al. | 219/121.74 |
| 6,818,854 B2 | * | 11/2004 | Friedman et al. | 219/121.6 |

* cited by examiner

Primary Examiner—M. Alexandra Elve

(57) ABSTRACT

A laser peening apparatus is available for laser peening a hidden surface of a workpiece, the hidden surface not being line-of-sight accessible to laser energy for treatment thereof. The apparatus includes a pulsed laser system and a laser directing unit. The pulsed laser system is configured for generating the laser energy used for laser peening. The laser directing unit operatively receives and channels the laser energy generated by the pulsed laser system. The laser directing unit includes a laser transmission end and is capable of variably and selectively positioning that laser transmission end. The laser directing unit is thereby configured for variably and selectively directing laser energy upon the hidden surface via the laser transmission end.

23 Claims, 3 Drawing Sheets

LASER PEENING OF DOVETAIL SLOTS BY FIBER OPTICAL AND ARTICULATE ARM BEAM DELIVERY

PRIORITY DATA

This application hereby claims the benefit under Title 35, United States Codes § 119 (e) of any U.S. application Ser. No. 60/449,565 filed Feb. 21, 2003, and is hereby incorporated by reference.

BACKGROUND OF THE INVENTION

1. Field of the Invention

The present invention relates to a method of laser peening a hidden surface of a workpiece, the hidden surface not being line-of-sight accessible to a laser beam for treatment, and, more particularly, to a method of laser peening dovetail slots in turbo machinery.

2. Description of the Related Art

In two components such as dovetail slots in turbo machinery, a significant cause of fatigue damage and failure in such components originates at the contact points therebetween. These contact points can be high stress, high fretting areas. As a result, fatigue cracks tend to initiate in such areas and can eventually propagate to an unacceptable damage threshold or failure.

Fretting fatigue is a process that occurs when two or more metallic components are in intimate contact with each other under active loading conditions. It occurs as a result of major axial load between two components accompanied by a cyclic load that introduces a small relative motion between the two components, such motion being on the order of microns. The fretting fatigue cracks tend to initiate in an area where the relative motion is greatest between the two surfaces. This area is typically at the edges of the contact area therebetween. Cracks generated from the cyclic load propagate in a direction at about 45° of the surface to the two components, due to the shear stress generated from the relative movement therebetween. The magnitude of this surface contact shear stress decreases with depth below the surface. Therefore, as the crack propagate into the component, the shear stress decreases until the cracks reach a depth at which the global stress begins to dominate.

When the global stress begins to dominate, the cracks begin to propagate perpendicular to the principal global tensile stress component. The crack can continue to propagate under the influence of the global tensile stress, possibly leading to eventual component failure.

Fretting fatigue is a relatively common problem in a number of components where there is a high contact stress between contact surfaces and vibratory stress that produces a slight relative motion between the two surfaces. Fretting fatigue often occurs at dovetail surfaces on mating turbine disk and blade attachment surfaces in aircraft jet engines. In the engines, centrifugal forces pull the blades against the surfaces of the dovetail slots of a turbine disk. This global loading is accompanied by a vibratory stress source that causes slight movement of the blade dovetail surfaces against the dovetail slot surfaces as the disk rotates. This movement can result in fretting and may lead to fretting crack initiation and, potentially, fatigue-induced failures of the disks and/or blades. As such, limiting or reducing the propagation of shear cracking caused by fretting fatigue can decrease maintenance costs and increase the life of a component.

One of the current measures taken to alleviate the fretting fatigue problem on dovetail slots has been the application of soft, compliant metallic coatings, such a copper-nickel-indium coatings, on the blade attachments. The soft, compliant coatings are applied as a thin layer to the blade attachment surface. Such coatings allow the peak contact stresses to be distributed uniformly across the contact area and reduce the relative motion between the surfaces. While these measures have helped extend service life, such coating have their own associated problems. These coatings generally degrade with each coating cycle and have to be reapplied to the attachment surfaces at periodic maintenance intervals.

Another technique that potentially increases fretting fatigue resistance is shot peening. However, two aspects limit shot peening as a method to increase fretting fatigue resistance in dovetail slots. The first limitation is that shot peening is only able to develop compressive residual stresses to relatively shallow depths. The compressive stress is limited to approximately 0.1 mm under typical processing conditions, where the shot media strike the surface at a near normal angle to the surface. However, the fretting fatigue cracks that are typically generated can be as deep as 0.1 mm and thus breach the residual compressive stress layer created by shock peening.

The second limitation associated with shot peening dovetail shock surfaces is the tight confines of the dovetail slot. The surfaces of the dovetail disk slots are difficult to access, thereby preventing a typical application of the shot peening process. In the tight confinement of the dovetail slot, the surfaces have to be shot peened at a lower incident angle, resulting in a lessened efficiency of the shot peening. Lowering the incident angle reduces the effective depth of the compressive stress layer created since the normal force (i.e., the force component perpendicular to the treated surface) of the shot media striking the surface is reduced significantly.

Laser peening processing of the fretting-prone areas on the dovetail slots of the disks is an excellent candidate technology to solve the fretting fatigue problem. Laser peening processing is capable of imparting deep residual compressive stresses (up to 1 mm deep) into the treated surface. The laser peening process can be applied at almost any angle to the surface as long as there is line-of-sight access to the surface to be processed. The surfaces can be processed with a low incident angle laser beam, if necessary, because the shockwave produced will propagate normal to the surface regardless of the laser beam incident angle.

Typical laser shock processing techniques and equipment can be found in U.S. Pat. No. 5,131,957 to Epstein along with that of U.S. Pat. No. 5,741,559 to Dulaney, each commonly assigned to the assignee of the present invention, the content of both of which is hereby incorporated by reference. U.S. Pat. No. 6,469,275 to Dulaney et al, which is commonly assigned along with the present invention and hereby incorporated by reference, discloses the use of laser peening to treat both the internal and external sections of a dovetail section (e.g., FIGS. 9 and 10 thereof).

Despite the significant potential offered by the laser peening processing to solve the fretting fatigue problem in dovetail slots, the immediate use of laser peening for treating the fretting surfaces has been inhibited because a portion of the dovetail surface has not been directly accessible with the laser beam.

What is needed is the art is the development of new, innovative beam delivery concepts that will promote delivery of laser peening energy to all surfaces, including those previously considered "hidden", to permit producing compressive residual stresses into these surfaces via laser peening.

SUMMARY OF THE INVENTION

The present invention relates to a selectively positionable laser peening apparatus and a method of use therefor, the selectively positionable laser peening apparatus having a laser transmission end, the laser transmission end being variably and selectively positionable and thereby configured for variably and selectively directing laser energy upon a hidden surface of a workpiece.

The present invention, in another form thereof, comprises a method of laser peening a laser surface of a workpiece, the hidden surface not being line-of-sight accessible to a laser beam for treatment. In the first step of the method, a selectively positionable laser peening apparatus is provided. The selectively positionable laser peening apparatus has a laser transmission end, the laser transmission end being variably and selectively positionable and thereby configured for variably and selectively directing laser energy upon the hidden surface. The next step is that of directing the laser transmission end toward the hidden surface. Finally, laser energy is delivered via the laser transmission upon the hidden surface to thereby initiate laser peening thereof.

The present invention, in yet another form thereof, comprises a laser peening apparatus for laser peening a hidden surface of a workpiece, the hidden surface not being line-of-sight accessible to laser energy of treatment thereof. The apparatus includes a pulsed laser system and a laser directing unit. The pulse laser system is configured for generating the laser energy used for laser peening. The laser directing unit operatively receives and channels the laser energy generated by the pulsed laser system. The laser directing unit includes a laser transmission end, the laser directing unit being capable of variably and selectively positioning that laser transmission end. The laser directing unit is thereby configured for variably and selectively directing laser energy upon the hidden surface via the laser transmission end. The laser directing unit includes one of a fiber-optic laser delivery mechanism and a telescopic articulated arm mechanism.

An advantage of the present invention is that it facilitates the delivery of laser energy to "hidden" workpiece surfaces, such as dovetail surfaces, to thereby permit such surfaces to attain compressive residual stresses using laser peening.

Another advantage of the present invention through use of the apparatus of the present invention, laser energy can be delivered at almost any angle and at any position of the surface of the workpiece, even to surfaces previously considered to be hidden.

Yet another advantage of the present invention is that the laser peening process only needs to be performed once to a given surface. The surface does not need to be reprocessed through its surface life, since the compressive stresses developed during laser peening are maintained through the life of the component. That the process only need be preformed once greatly reduces maintenance costs.

Yet another advantage of the present invention is that it can potentially be applied to obtain compressive residual stresses inside holes with high aspect ratios, holes where compressive residual stresses are needed to increased fatigue life, and/or any parts that have surfaces that need peening but are not directly accessible with current laser beam delivery techniques. As such, this technique is potentially useful in the processing of components in areas such as automotive, machine tools, mass production equipment, and aerospace.

BRIEF DESCRIPTION OF THE DRAWINGS

The above-mentioned and other features and advantages of this invention, and the manner of attaining them, will become more apparent and the invention will be better understood by reference to the following description of various embodiments of the invention taken in conjunction with the accompanying drawings, wherein.

Figure 1:
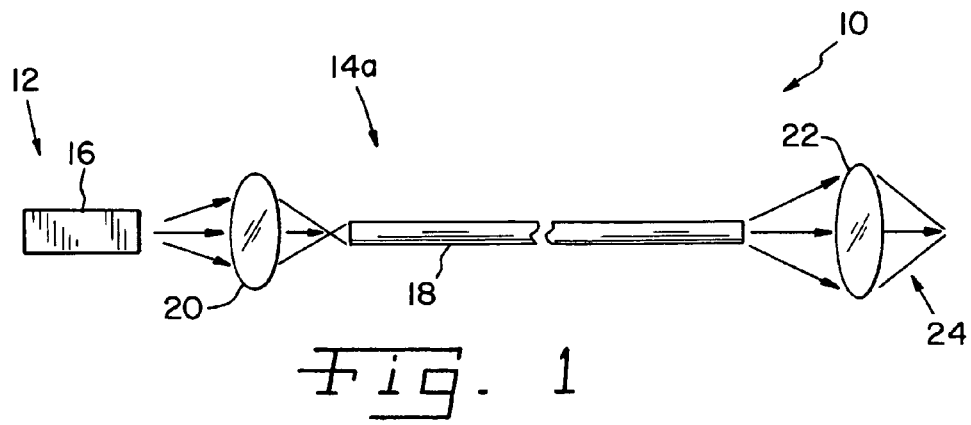
FIGS. 1–4 are side, schematic views of four separate embodiments of the laser peening apparatus of the present invention, each employing a particular fiber optic beam delivery system as the laser directing unit.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF THE INVENTION

The present invention relates to a laser peening apparatus 10 (various embodiments of which are shown in FIGS. 1–6) that is capable of laser peening surfaces that are not line-of-sight accessible to the laser beam. Laser peening apparatus 10 generally includes a pulsed laser system 12 and a laser directing unit 14.

Pulsed laser system 12 includes one or more laser units 16. Each laser unit 16 has an active medium fabricated from Nd-doped-phosphate glass, YAG, or YLF. The pulse width of each laser unit is advantageously less than 50 ns, and its operational frequency is advantageously greater than 1 Hz. The laser intensity to be generated on the surface being treated is preferably greater than 4 GW/cm$^2$, and the beam diameter generated by such a laser unit 16 on the surface of workpiece may be less than 2 mm.

FIGS. 1–4 show various embodiments of laser peening apparatus 10 which specifically employ a fiber optic beam delivery system 14a as the laser directing unit 14. Each laser directing unit 14 of the embodiment shown in FIGS. 1–4 has at least one fiber optic cable 18, an input focusing lens 20 associated with each fiber optic cable 18, and a single output focusing lens 22 for the fiber optic beam delivery system 14a.

Each fiber optic cable 18 used for fiber optic beam delivery system 14a is to be formed of a flexible fiber allowing the direction of a laser beam carried therewithin to be redirected toward a surface that is not in line-in-sight of the overall system. The fiber optic cable 18 used for the beam delivery will preferably have an inside core diameter of greater than 500 microns, the core of which can be either hollow or solid.

Each input focusing lens 20 is arranged and configured for focusing and thereby directing laser energy into a corresponding fiber optic cable 18. Output focusing lens 22 is located at a laser transmission end 24 of the laser directing unit 14, in this case specifically fiber optic beam delivery system 14a. Output focusing lens 22 is thereby positioned and configured for controlling the size of beam on a target surface. Depending on the overall configuration of the laser directing unit and whether the overall laser peening apparatus 10 incorporates a water flow therewithin, output focusing lens 22 may also act as a window to prevent water from flowing into laser directing unit 14. Four separate embodiments of fiber optic beam delivery system 14a are shown in FIGS. 1–4, respectively.

FIG. 1 shows a laser beam from a pulsed laser system 12 being coupled into a single fiber optic cable 18. The output from fiber optic cable 18 is then coupled to the surface of a given target by output focusing lens 22 at laser transmission end 24. The flexible fiber 18 allows the direction of the laser beam to be redirected towards a surface that is not in line-of-sight of the laser beam. A mechanism (not shown) is provided for facilitating and controlling the redirection of laser transmission end 24 and thus the direction of the laser beam output therethrough.

Figure 2:
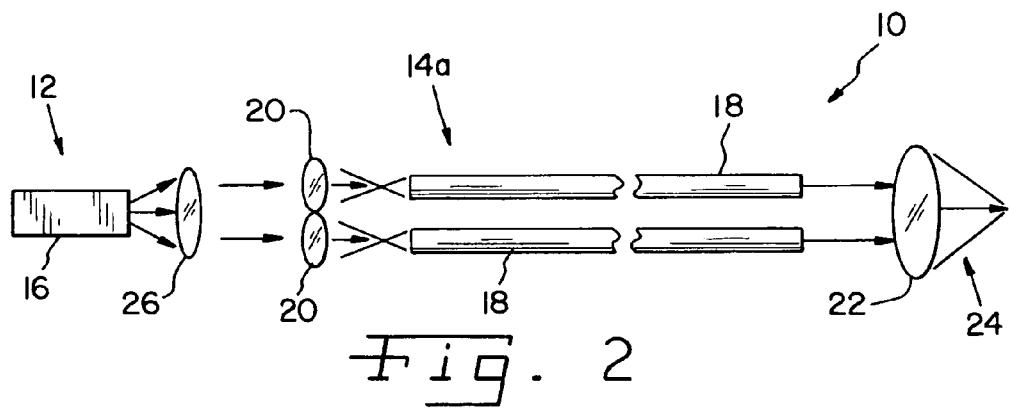

FIG. 2 shows another configuration of fiber optic beam delivery system 14a. In this configuration, the output of laser unit 16 (from pulsed laser system 12) is coupled into multiple fiber optic cables 18. In this case a higher energy laser unit 16 would be employed, as well as an auxiliary focusing lens 26 for directing the laser energy away from pulsed laser system 12 and into the respective input focusing lenses 20 associated with the plurality of fiber optic cables 18. The use of additional fiber optic cables 18 allows a larger area to be peened for each laser pulse, thus reducing processing time and cost.

Figure 3:
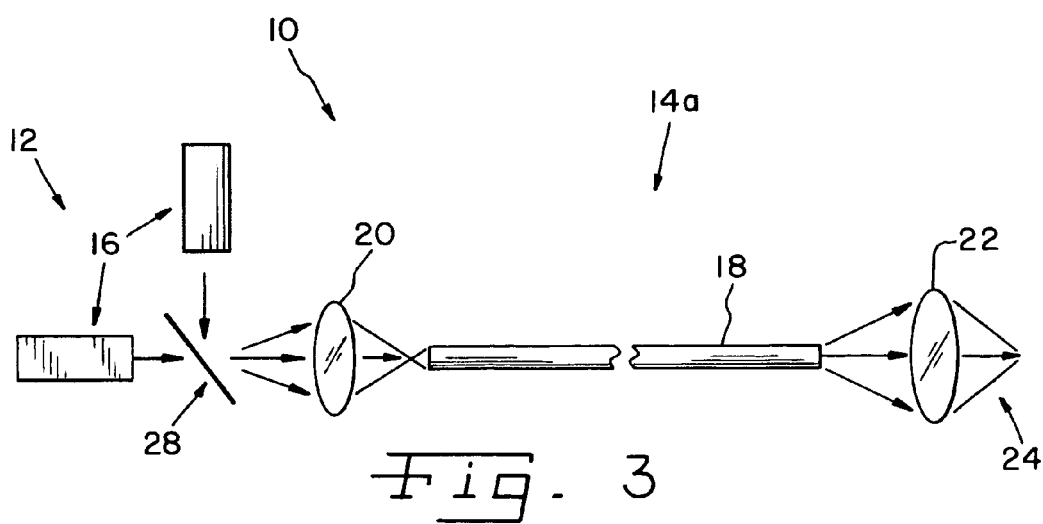

The embodiment of FIG. 3 involves coupling multiple pulsed laser units 16 into a single fiber optic cable 18. This configuration increases the peening frequency and decreases processing time. In this configuration a polarizing beam splitter 28 allows multiple beams to be coupled into the same fiber optic cable 18. In this particular embodiment pulse laser units 16 are arranged so as to be approximately orthogonal to each other and to be directed at an angle to a face of polarizing beam splitter 28, as seen from FIG. 3.

Figure 4:
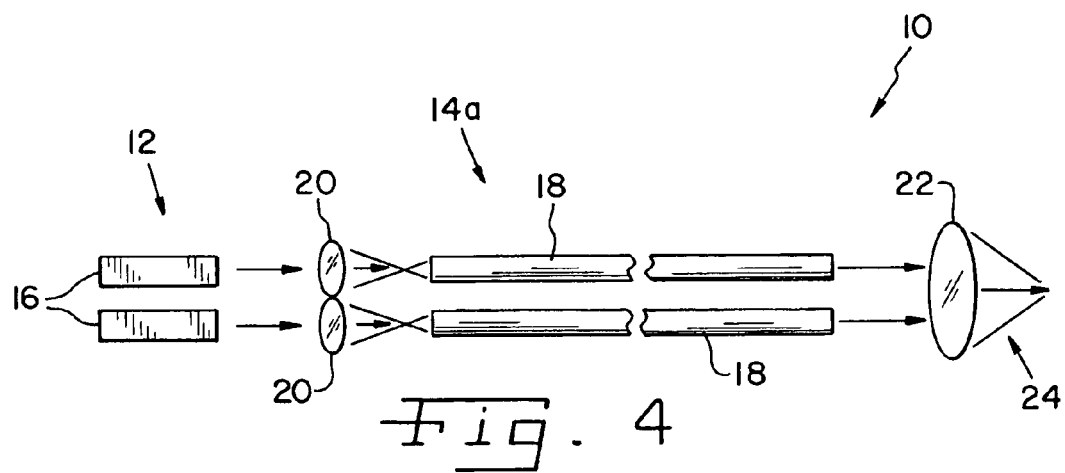

Another version couples multiple laser units 16 into multiple fiber optic cables 18. This configuration is shown in FIG. 4.

Figure 5:
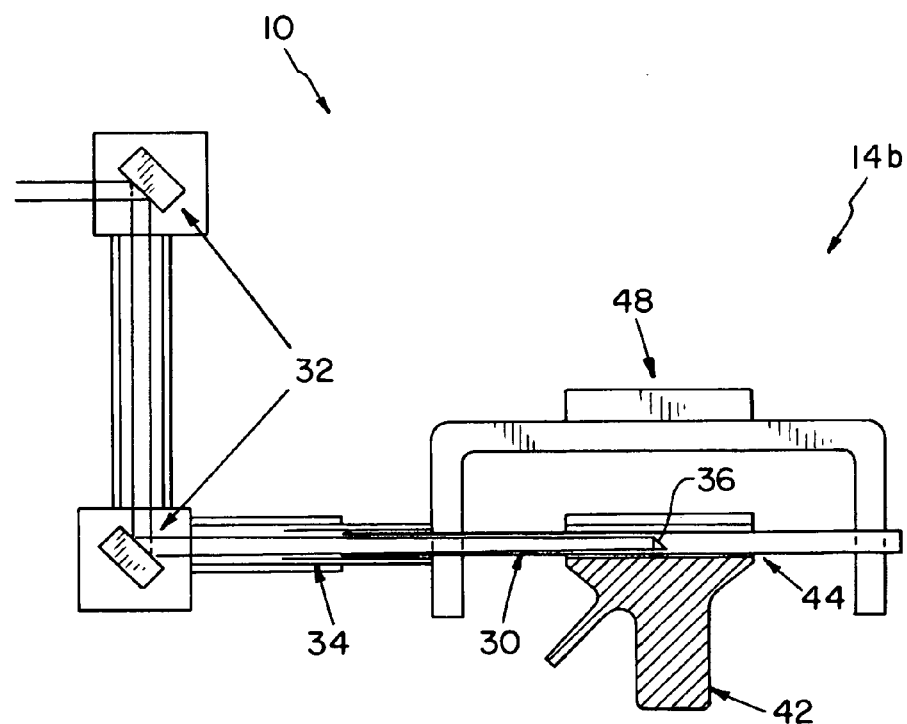
FIG. 5 is a side, schematic view of an embodiment of the laser peening apparatus of the present invention, employing a telescopic articulated arm mechanism as the laser directing unit.
Figure 6:
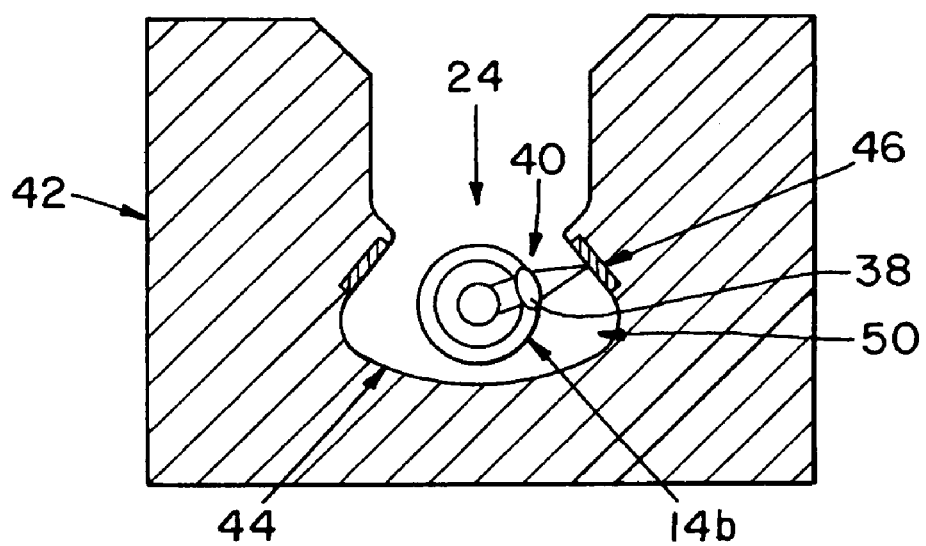
FIG. 6 is a cross-sectional, schematic view of an adjustable telescoping member of the telescopic articulate arm mechanism shown in FIG. 5, the adjustable telescoping member being shown positioned within a dovetail slot of a blade attachment.

FIGS. 5 and 6 illustrate a separate embodiment for laser directing unit 14b. In this embodiment laser directing unit 14b is a telescopic articulated arm mechanism 14b. Telescopic articulated arm mechanism 14b can be designed so as to be controlled robotically and/or manually. The telescopic articulated arm mechanism 14b shown in FIGS. 5 and 6 includes laser delivery tubing 30, two mirrors 32, an adjustable telescoping member 34, a prism 36 and a telescoping member focusing lens 38. Laser delivery tubing 30 serves as a channel through which the given laser beam is transmitted. At least two mirrors 32 are mounted within laser delivery tubing 30 for redirection of the laser beam transmitted therein.

Adjustable telescoping member 34 is coupled with laser delivery tubing 30. Adjustable telescoping member 34 is configured for receiving the laser beam therethrough and has a laser transmission opening 40 at the laser transmission end 24 thereof. Due to the adaptable nature of adjustable telescoping member 34, the angular and linear position of laser transmission opening 40 can be selected. Prism 36 and telescoping member focusing lense 38 are each located in the vicinity of laser transmission opening 40. Specifically, prism 36 is mounted in adjustable telescoping member 34.

Prism 36 is specifically positioned and configured for redirecting the laser beam within adjustable telescoping member 34 outwardly toward and ultimately through laser transmission opening 40. Telescoping member focusing lens 38 is actually located with laser transmission opening 40 and is configured for focusing the laser beam, redirected by prism 36, onto a workpeice surface for laser peening thereof. In this embodiment, as seen in FIG. 6, the workpiece is a blade attachment 42, and the workpeice surface is a dovetail slot thereof. A pair of laser peened patches 46 are indicated upon dovetail slot 44. As can be seen from FIG. 6, these laser peened areas are hidden from a direct line-of-sight.

Telescopic articulated arm mechanism 14b in the embodiment shown in FIGS. 5 and 6, is further provided with a robotic unit 48. Robotic unit 48 is configured for translating and rotating adjustable telescoping member 34 in a manner so as to permit selective linear and angular positioning of laser transmission opening 40 and to ultimately allow control of the direction and location of the laser beam transmitted through such opening 40.

As is common practice in laser shock peening, telescopic articulated arm mechanism 14b has an associated water flow 50 for aiding in the control of the laser shock peening process. Such water flow 50 is only schematically indicated, for sake of simplicity, in FIG. 6.

In a method of laser peening a hidden surface of a workpiece, the first step is that of providing a selectively positionable laser peening apparatus 10 having a laser transmission 24 that is variably and selectively positionable and thereby configured for variably and selectively directing laser energy upon a hidden surface (e.g., dovetail slot 44) of a workpiece (e.g., blade attachment 42). The next step is to direct the laser transmission end 24 toward the hidden surface that is to be treated, i.e., patch 46 within dovetail slot 44. Laser energy is then delivered, via the laser transmission end 24, upon the hidden surface to thereby initiate laser peening thereof.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed:

1. A method of laser peening a hidden surface of a workpiece, the hidden surface not being line-of-sight accessible to any laser beam propagating without redirection along an initial propagation path for emissions thereof for treatment of the workpiece, said method comprising the steps of:

providing a selectively positionable laser peening apparatus, said selectively positionable laser peening apparatus having a laser transmission end defining an output for laser emissions from said laser peening apparatus, said laser transmission end being variably and selectively positionable and thereby configured for variably and selectively directing laser energy upon the hidden surface;

maneuvering at least said laser transmission end so that said maneuvered laser transmission end has line of sight laser communication accessibility with the hidden surface; and delivering laser energy, via said maneuvered laser transmission end, upon the hidden surface to thereby initiate laser peening thereof.

2. The method of claim 1, wherein said selectively positionable laser peening apparatus comprises:

a pulsed laser system configured for generating the laser energy used for laser peening; and a laser directing unit operatively receiving and channeling the laser energy generated by said pulsed laser system, said laser directing unit including said laser transmission end, said laser directing unit being capable of variably and selectively positioning said laser transmission end, said laser directing unit thereby configured for variably and selectively directing laser energy upon the hidden surface via said laser transmission end.

3. The method of claim 2, wherein said laser directing unit includes one of a fiber-optic laser delivery mechanism and a telescopic articulated arm mechanism.

4. The method of claim 3, wherein said laser directing unit includes a fiber-optic laser delivery mechanism, said fiber-optic laser delivery mechanism including at least one laser coupled to at least one fiber optic cable.

5. The method of claim 3, wherein said selectively positionable laser peening apparatus includes a telescopic articulated arm mechanism.

6. The method of claim 5, wherein said telescopic articulated arm mechanism comprises:

a laser delivery tubing through which a laser beam is transmitted;

at least one mirror mounted within said laser delivery tubing, each said mirror positioned so as to redirect the laser beam;

an adjustable telescoping member coupled with said laser delivery tubing, said adjustable telescoping member configured for receiving the laser beam therethrough, said adjustable telescoping member having a laser transmission opening at said laser transmission end;

one of a prism and highly reflective mirror mounted in said adjustable telescoping member adjacent said laser transmission opening, said one of a prism and highly reflective mirror being positioned and configured for redirecting the laser beam within said adjustable telescoping member outwardly through said laser transmission opening; and a focusing lens located within said laser transmission opening of said adjustable telescoping member, said focusing lens configured for focusing the laser beam redirected by said one of a prism and highly reflective mirror, the laser beam thereby being focused upon the hidden surface of the workpiece.

7. The method of claim 5, wherein said telescopic articulated arm mechanism has an adjustable telescoping member and a robotic unit operatively coupled with said adjustable telescoping member, said robotic unit being configured for translating and rotating said adjustable telescoping member.

8. The method of claim 1, wherein the workpiece is a turbine disk having a dovetail slot, the hidden surface being located in the dovetail slot.

9. A laser peening apparatus for laser peening a hidden surface of a workpiece, the hidden surface not being line-of-sight accessible to laser energy propagating without redirection along an initial propagation path for emissions thereof for treatment of the workpiece, said apparatus comprising:

a pulsed laser system configured for generating the laser energy used for laser peening; and a laser directing unit operatively receiving and channeling the laser energy generated by said pulsed laser system, said laser directing unit including a laser transmission end defining an output for laser emissions from said laser peening apparatus, said laser directing unit being capable of variably and selectively positioning said laser transmission end, said laser directing unit being adapted to provide operable maneuvering of at least said laser transmission end so that said operably maneuvered laser transmission end has line of sight laser communication accessibility with the hidden surface, said laser directing unit thereby configured for variably and selectively directing laser energy upon the hidden surface via said operably maneuvered laser transmission end.

10. The laser peening apparatus of claim 9, wherein said laser directing unit includes one of a fiber-optic laser delivery mechanism and a telescopic articulated arm mechanism.

11. The laser peening apparatus of claim 10, wherein said laser directing unit includes a fiber-optic laser delivery mechanism, said fiber-optic laser delivery mechanism including at least one laser coupled to at least one fiber optic cable, each said fiber optic cable being flexible so as to facilitate redirection of laser energy transmitted therethrough.

12. The laser peening apparatus of claim 11, wherein said pulsed laser system includes a single laser unit for generating pulsed laser energy, said fiber-optic laser delivery mechanism including a single fiber optic cable.

13. The laser peening apparatus of claim 11, wherein said pulsed laser system includes a single laser unit for generating pulsed laser energy, said fiber-optic laser delivery mechanism including at least two fiber optic cables.

14. The laser peening apparatus of claim 11, wherein said pulsed laser system includes a first laser unit and a second laser unit for generating pulsed laser energy, said first laser unit beam being generally orthogonally aligned relative to said second laser unit beam, said first laser unit and said second laser unit each directing laser energy toward a polarizing beam splitter, said fiber-optic laser delivery mechanism including a single fiber optic cable, said fiber optic cable receiving laser energy from said first laser unit and said second laser unit via said beam splitter.

15. The laser peening apparatus of claim 11, wherein said pulsed laser system includes a first plurality of laser units for generating pulsed laser energy, said fiber-optic laser delivery mechanism including a second plurality of fiber optic cables, each said laser unit being coupled with a corresponding said fiber optic cable.

16. The laser peening apparatus of claim 11, wherein said fiber-optic laser delivery mechanism has an output focusing lens associated therewith proximate said laser transmission end for directing the laser energy carried thereby upon the hidden surface.

17. The laser peening apparatus of claim 11, wherein each said fiber-optic cable has a core that is one of solid and hollow.

18. The laser peening apparatus of claim 10, wherein said laser directing unit includes a telescopic articulated arm mechanism.

19. The laser peening apparatus of claim 18, wherein said telescopic articulated arm mechanism comprises:

a laser delivery tubing through which a laser beam is transmitted;

at least one mirror mounted within said laser delivery tubing, each said mirror positioned so as to redirect the laser beam;

an adjustable telescoping member coupled with said laser delivery tubing, said adjustable telescoping member configured for receiving the laser beam therethrough, said adjustable telescoping member having a laser transmission opening at said laser transmission end;

one of a prism and a highly reflective mirror mounted in said adjustable telescoping member adjacent said laser transmission opening, said prism being positioned and configured for redirecting the laser beam within said adjustable telescoping member outwardly through said laser transmission opening; and a focusing lens located within said laser transmission opening of said adjustable telescoping member, said focusing lens configured for focusing the laser beam redirected by said prism, the laser beam thereby being focused upon the hidden surface of the workpiece.

20. The laser peening apparatus of claim 18, wherein said telescopic articulated arm mechanism has an adjustable telescoping member and a robotic unit operatively coupled with said adjustable telescoping member, said robotic unit being configured for translating and rotating said adjustable telescoping member.

21. The laser peening apparatus of claim 9, wherein said pulsed laser system is configured for generating a laser power such that a laser intensity on the surface of the workpiece is to be greater than about 4 $GW/cm^2$.

22. The laser peening apparatus of claim 9, wherein said pulsed laser system is configured for generating a laser beam having a pulse width of less than about 50 ns and an operational frequency of greater than about 1 Hz.

23. The laser peening apparatus of claim 9, wherein said pulsed laser system employs an active laser medium, said active laser medium being one of Nd-doped phosphate glass, YAG, and YLF.

* * * * *